(12) United States Patent
Harle et al.

(10) Patent No.: US 8,623,122 B2
(45) Date of Patent: Jan. 7, 2014

(54) TREATMENT OF GASES TO REDUCE THE CARBON DIOXIDE CONTENTS THEREOF

(75) Inventors: Virginie Harle, Senlis (FR); Gérard Mignani, Lyons (FR)

(73) Assignee: Rhodia Operations, Aubervilliers (FR)

( * ) Notice: Subject to any disclaimer, the term of this patent is extended or adjusted under 35 U.S.C. 154(b) by 216 days.

(21) Appl. No.: 12/994,522

(22) PCT Filed: May 14, 2009

(86) PCT No.: PCT/EP2009/055838
§ 371 (c)(1), (2), (4) Date: Feb. 14, 2011

(87) PCT Pub. No.: WO2009/144143
PCT Pub. Date: Dec. 3, 2009

(65) Prior Publication Data
US 2011/0162525 A1      Jul. 7, 2011

(30) Foreign Application Priority Data
May 28, 2008   (FR) ...................................... 08 02892

(51) Int. Cl.
*B01D 53/02*   (2006.01)
(52) U.S. Cl.
USPC ............................................. 95/139; 95/900
(58) Field of Classification Search
None
See application file for complete search history.

(56) References Cited

U.S. PATENT DOCUMENTS

| | | | | |
|---|---|---|---|---|
| 4,937,059 A * | 6/1990 | Kolts et al. | ..................... | 423/230 |
| 5,587,003 A * | 12/1996 | Bulow et al. | ..................... | 95/123 |
| 5,712,218 A | 1/1998 | Chopin et al. | | |
| 6,350,298 B1 * | 2/2002 | Su et al. | ............................. | 95/96 |
| 6,838,587 B2 * | 1/2005 | Lattner et al. | ..................... | 585/807 |
| 2001/0001782 A1 * | 5/2001 | Ohashi et al. | ................. | 502/400 |
| 2004/0123736 A1 | 7/2004 | Torres, Jr. et al. | | |
| 2008/0121105 A1 * | 5/2008 | Schubert et al. | ................ | 95/139 |
| 2010/0139486 A1 * | 6/2010 | Smirniotis et al. | .............. | 95/139 |

FOREIGN PATENT DOCUMENTS

| | | |
|---|---|---|
| EP | 0605274 A1 | 7/1994 |
| EP | 1637574 A1 | 3/2006 |

OTHER PUBLICATIONS

International Search Report corresponding to PCT/EP2009/055838.

* cited by examiner

*Primary Examiner* — Duane Smith
*Assistant Examiner* — Phillip Shao
(74) *Attorney, Agent, or Firm* — Dentons US LLP

(57) ABSTRACT

A method for processing a $CO_2$-containing gas in order to reduce the carbon dioxide content thereof, includes contacting the gas with a compound of at least one rare earth element, whereby the carbon dioxide is adsorbed onto the compound and a carbon dioxide-depleted gas is thus obtained; such compound is more particularly an oxide, and the rare earth element is particularly selected from among cerium, lanthanum or praseodymium.

9 Claims, No Drawings

TREATMENT OF GASES TO REDUCE THE CARBON DIOXIDE CONTENTS THEREOF

CROSS-REFERENCE TO PRIOR APPLICATIONS

This application claims priority under 35 U.S.C. §119 of FR 0802892, filed May 28, 2008, and is the U.S. National Stage of PCT/EP 2009/055838, filed May 14, 2009 and designating the United States (published in the French language on Dec. 3, 2009, as WO 2009/144143 A1; the title and abstract were also published in English), each hereby expressly incorporated by reference in its entirety and each assigned to the assignee hereof.

The present invention relates to a process for the treatment of a gas in order to reduce its carbon dioxide content.

It is known that carbon dioxide ($CO_2$) is one of the gases which contribute to the greenhouse effect. For ecological reasons, it is increasingly desired to limit the amounts thereof produced.

There already exist processes which make it possible to capture the $CO_2$ in gases, in particular in the flue gases emitted by industrial plants, such as gas turbines or boilers.

Some of these processes use amines in a solvent medium. The disadvantage of these processes is the high cost of the amines and their instability at high temperature. Other processes employ inorganic materials based on an alkaline earth metal, such as barium or calcium, or on an alkali metal, such as potassium. These materials are effective in capturing $CO_2$ but have the disadvantage of being able to release the latter only at high temperature, for example at greater than 350° C.

There thus exists a need for a process in which the compound used to capture the $CO_2$ is temperature-stable and, preferably, capable of releasing the $CO_2$ at a lower temperature than in the known processes.

The object of the invention is to provide such a compound.

With this aim, the process of the invention for the treatment of a gas in order to reduce its carbon dioxide content is characterized in that the gas is brought into contact with a compound of at least one rare earth metal, whereby the carbon dioxide is adsorbed on the compound and a gas depleted in carbon dioxide is obtained.

The use of a rare earth metal compound has the advantage of making possible in particular a maximum release of the adsorbed $CO_2$ at a temperature which can be less than 300° C. and even at most 250° C. and in addition within a narrower temperature range than in the case of the processes of the prior art, that is to say a range having a magnitude which can be less than 300° C.

Other characteristics, details and advantages of the invention will become even more fully apparent on reading the description which will follow and the various concrete but nonlimiting examples intended to illustrate it.

The term "rare earth metal" is understood to mean, in the continuation of the description, the elements of the group consisting of yttrium and the elements of the Periodic Table with an atomic number between 57 and 71 inclusive.

The term "specific surface" is understood to mean the B.E.T. specific surface determined by nitrogen adsorption in accordance with the ASTM standard D 3663-78, drawn up from the Brunauer-Emmett-Teller method described in the periodical "The Journal of the American Chemical Society, 60, 309 (1938)".

In addition, the calcinations on conclusion of which the surface values are given are calcinations under air. Furthermore, the specific surface values which are shown for a given temperature and a given duration correspond, unless otherwise indicated, to calcinations at a stationary temperature over the duration shown.

The main characteristic of the invention is the use of a rare earth metal compound for capturing or adsorbing the $CO_2$ present in the gas to be treated. This compound can be based on an oxide, on an oxyhydroxide, on a nitrate or on a carbonate.

It should be noted that, for the present description, the term "oxide", when it is used concerning the rare earth metal compound, is to be understood not only within the meaning of oxide but also within the meaning of carbonated oxide as the oxides can often become carbonated by simple contact with the air, and they can also comprise nitrates. In this case, it is preferable to subject the compound to a first regeneration heat treatment in order to at least partially remove the nitrates and carbonates from the surface. This treatment can be carried out by heating under a gas stream, in particular a stream of air, which air can comprise water vapor, at temperatures greater than or equal to those used in the process for regenerating the material after storage of $CO_2$. For matters concerning the economics of the process, the temperature will be as low as possible, typically less than 500° C., preferably less than 300° C.

According to a preferred embodiment of the invention, the compound is based on at least one rare earth metal chosen from cerium, lanthanum or praseodymium. This embodiment applies more particularly to the case where the compound is in the oxide form. Mention may more particularly be made of the compounds based on cerium and on lanthanum, based on cerium and on praseodymium or based on cerium, on lanthanum and on praseodymium, these elements being more particularly still in the oxide form in the compound.

According to another embodiment, use is made of a compound of at least one rare earth metal which additionally comprises zirconium. This compound can comprise one or more rare earth metals.

Mention may in particular be made, in the context of this embodiment, of the compounds based on cerium and on zirconium, based on cerium, on zirconium and on praseodymium, based on cerium, on zirconium and on lanthanum or based on cerium, on zirconium, on praseodymium and on lanthanum.

In this embodiment, the compounds can more particularly be based on the oxides of the elements mentioned (cerium, zirconium and other rare earth metals).

Generally, in the case of compounds based on cerium and on at least one other element chosen from zirconium and rare earth metals, the proportion of cerium can in particular be at least 50% and more particularly at least 70%, this proportion being expressed as cerium oxide $CeO_2$ equivalent with respect to the total weight, in the compound, of the cerium and of the other element or elements, expressed as oxide. The cerium content can more particularly still be at least 80%, indeed even at least 90%.

The proportions given above apply more particularly to the case where the cerium and the other element or elements are in the form of oxides in the compound.

These proportions can apply more particularly to the case where the rare earth metal other than cerium is lanthanum and/or praseodymium.

The proportion (expressed as above) of rare earth metal other than cerium or of zirconium is usually at least 0.5%, more particularly at least 1%.

According to another preferred embodiment, use is made, in the process of the invention, either of a compound of at least one rare earth metal which additionally comprises zirconium or of a compound of at least two rare earth metals, this compound then being provided in the form of a solid solution.

The term "solid solution" is understood to mean that the X-ray diffraction diagrams of the compounds reveal, within the latter, the existence of a single homogeneous phase. For example, for the compounds which are richest in cerium, this phase in fact corresponds to that of a crystalline ceric oxide $CeO_2$, the unit cell parameters of which are more or less offset with respect to a pure ceric oxide, thus reflecting the incorporation of the other element, zirconium or rare earth metal, in the crystal lattice of the cerium oxide and thus the production of a true solid solution.

It can be advantageous also to use a compound based on cerium, on zirconium and optionally on at least one other rare earth metal in which the surface of the compound exhibits a higher content of cerium and optionally of at least the other rare earth metal than the mean content, in this compound, of cerium and, if appropriate, of at least the other rare earth metal and where, in contrast, the internal part of this same compound exhibits a lower content of cerium and, if appropriate, of at least the other rare earth metal than this mean content.

It is preferable to use compounds having a high specific surface. Thus, it is possible to employ compounds which exhibit a specific surface of at least 40 $m^2/g$, more particularly of at least 70 $m^2/g$ and more particularly still of at least 100 $m^2/g$, these surface values applying to compounds which have been subjected, during their preparation, to a calcination at a temperature at least equal to 500° C.

A few examples of the compounds which can be employed in the present invention will be given below.

Thus, use may in particular be made of cerium oxides having a stabilized specific surface. This is understood to mean cerium oxides which exhibit a high specific surface even after having been exposed to high temperatures.

Mention may thus be made of the cerium oxides described in patent applications EP-A-153 227, EP-A-153 228, EP-A-239 478 and EP-A-275 733. These oxides can exhibit surfaces of at least 85 $m^2/g$, in particular of at least 100 $m^2/g$, after calcination at a temperature between 350 and 450° C. over a period of time of 6 hours, for example.

Use may also be made of the cerium oxide described in EP-A-300 852, which exhibits a specific surface of at least 15 $m^2/g$ after calcination at a temperature of between 800° C. and 900° C. for 2 hours at least, or the same oxide described in EP-A-388 567, which exhibits a surface of at least 190 $m^2/g$ after calcination at a temperature of between 350° C. and 450° C. for 2 hours at least with, in addition, also a specific surface of at least 15 $m^2/g$ after calcination at a temperature of between 800° C. and 900° C. over the same period of time. The oxides which were described in the above paragraphs may advantageously be subjected to a further calcination at 500° C. under air before they are used.

Use may also be made, as advantageous compound also having a high specific surface, of compositions based on a cerium oxide and on a zirconium oxide and more particularly the compositions for which a cerium/zirconium atomic proportion of at least 1 is present.

Mention may thus be made of the cerium oxide described in EP-A-207 857, which exhibits a specific surface of greater than 10 $m^2/g$ up to a temperature of 900° C. This oxide can exhibit in particular a zirconium oxide content of between 1 and 20%, with respect to the weight of the ceric oxide. Mention may also be made of the composition based on cerium oxide and on zirconium oxide which forms the subject-matter of EP-A-605 274 and in which the zirconium is in solid solution in the cerium oxide. This composition can exhibit a specific surface of at least 30 $m^2/g$ after calcination at 800° C. for 6 hours.

Use may also be made, as support, of compositions having a high specific surface of the type based on a cerium oxide and on a zirconium oxide and on at least one oxide chosen from oxides of a rare earth metal other than cerium.

Such compositions are described in particular in EP-A-906 244. In the latter document, the compositions exhibit a cerium/zirconium atomic proportion of at least 1 and a specific surface of at least 35 $m^2/g$ after calcination at 900° C. for 6 hours. This surface can more particularly be at least 40 $m^2/g$. It can more particularly still be at least 45 $m^2/g$. These compositions are prepared by a process in which a mixture in a liquid medium is prepared comprising a cerium compound, a zirconium compound, which can in particular be a zirconyl nitrate obtained by attack of nitric acid on a zirconium carbonate, and a rare earth metal compound, said mixture is heated, the precipitate obtained is recovered and this precipitate is calcined. The starting mixture is prepared by using a zirconium solution which is such that the amount of base necessary to reach the equivalent point during acid/base titration of this solution adheres to the condition $OH^-/Zr$ molar ratio $\leq 1.65$.

Compounds which can be used are also those based on a cerium oxide and on a praseodymium oxide and for which the proportion of praseodymium can range up to a ratio by weight, expressed as praseodymium oxide with respect to the cerium oxide, of 50%. This proportion is usually at least 0.5%. This proportion can thus be between 1 and 40%, in particular between 1 and 20% and more particularly between 1 and 10%. According to an alternative form, the composition can additionally comprise zirconium. Compositions of this type are described in FR 2729309 A1 and exhibit, after calcination at 400° C. for 6 hours, a specific surface of at least 10 $m^2/g$, preferably at least 60 $m^2/g$ and more particularly of at least 80 $m^2/g$.

As regards the compounds based on cerium, on zirconium and optionally on at least one other rare earth metal which were described above and for which the concentrations of cerium and of rare earth metal are different at the surface of and inside the compounds, such products can be obtained by impregnation, with a solution comprising a cerium compound and optionally a compound of the rare earth metal, of a compound based on cerium, on zirconium and on rare earth metal, if appropriate, prepared beforehand according to the teaching of one of the abovementioned patent applications.

A description will be given below of a specific embodiment of the invention which employs compositions based on cerium oxide and on at least one oxide of another rare earth metal and which have the characteristic of exhibiting particularly high specific surfaces since the specific surface is at least 20 $m^2/g$ after calcination at 1000° C. for 5 hours.

The compositions of this specific embodiment are composed essentially of cerium oxide and of one or more oxides of a rare earth metal.

The term "is composed essentially" is understood to mean that these compositions under consideration comprise only the oxides of the above-mentioned elements, cerium and other rare earth metal, and that they do not comprise oxide of another element, such as zirconium in particular, capable of having a positive influence on the stability of the specific surface of the composition. On the other hand, the compositions can comprise elements, such as impurities, which can originate in particular from its process of preparation, for example from the starting materials or starting reactants used.

The rare earth metal can more particularly be yttrium, neodymium, lanthanum or praseodymium. According to an alternative form, lanthanum and praseodymium are present in combination in the composition.

The content of rare earth metal oxide is generally at most 25% by weight, preferably when the rare earth metal is lanthanum, more particularly at most 20% by weight and preferably at most 15% by weight. The minimum content is not critical but it is generally at least 1% by weight, more particularly at least 2% by weight and preferably at least 5% by weight. This content is expressed as oxide of the rare earth metal, with respect to the weight of the whole of the composition.

The compositions of this specific embodiment of the invention can additionally exhibit a specific surface of at least 22 $m^2/g$ after calcination at 1000° C. for 5 hours. More generally, values of at least approximately 25 $m^2/g$ can be obtained under the same calcination conditions.

The specific surfaces of the compositions of this specific embodiment of the invention can still remain high even at an even higher temperature. Thus, these surfaces can be at least 10 $m^2/g$, more particularly at least 14 $m^2/g$, after calcination at 1100° C. for 5 hours.

Finally, the compositions of this embodiment can exhibit a specific surface of at least 30 $m^2/g$ after calcination at 900° C. for 5 hours. More generally, values of at least approximately 35 $m^2/g$ can be obtained under the same calcination conditions.

These compositions are prepared by a specific process which will now be described.

This process is characterized in that it comprises the following stages:

- a liquid medium comprising a cerium compound is formed;
- the medium is heated at a temperature of at least 100° C.;
- the precipitate obtained on conclusion of the preceding stage is separated from the liquid medium, a compound of the other rare earth metal is added thereto and another liquid medium is formed;
- the medium thus obtained is heated at a temperature of at least 100° C.;
- the reaction medium obtained on conclusion of the preceding heating operation is brought to a basic pH;
- the precipitate resulting from the preceding stage is separated and calcined.

The first stage of the process thus consists in forming a liquid medium comprising a cerium compound.

The liquid medium is generally water.

The cerium compound is preferably chosen from soluble compounds. This can in particular be an organic or inorganic acid salt, such as a nitrate, a sulfate, an acetate, a chloride or a ceric ammonium nitrate.

Preferably, ceric nitrate is used. It is advantageous to use salts with a purity of at least 99.5% and more particularly of at least 99.9%. An aqueous ceric nitrate solution can, for example, be obtained by reaction of nitric acid with a ceric oxide hydrate prepared conventionally by reaction of a solution of a cerous salt, for example cerous nitrate, and of an aqueous ammonium solution in the presence of aqueous hydrogen peroxide solution. Use may also preferably be made of a ceric nitrate solution obtained according to the process for electrolytic oxidation of a cerous nitrate solution as described in the document FR-A-2 570 087, which constitutes an advantageous starting material here.

It should be noted here that the aqueous solutions of cerium salts may exhibit a degree of initial free acidity which can be adjusted by the addition of a base or of an acid. However, it is just as possible to employ an initial solution of cerium salts actually exhibiting a degree of free acidity as mentioned above as solutions which will have been neutralized beforehand in a more or less exhaustive fashion. This neutralization can be carried out by addition of a basic compound to the abovementioned mixture, so as to limit this acidity. This basic compound can, for example, be an aqueous ammonia solution or a solution of alkali metal (sodium, potassium, and the like) hydroxides but is preferably an aqueous ammonium solution.

Finally, it should be noted that, when the starting mixture comprises cerium essentially in the III form, it is preferable to involve, in the course of the process, an oxidizing agent, for example aqueous hydrogen peroxide solution.

It is also possible to use a sol as starting cerium compound. The term "sol" denotes any system composed of fine solid particles of colloidal dimensions, that is to say dimensions of between approximately 1 nm and approximately 500 nm, based on a cerium compound, this compound generally being a cerium oxide and/or a cerium oxide hydrate, in suspension in an aqueous liquid phase, it being possible for said particles in addition to optionally comprise residual amounts of bonded or adsorbed ions, such as, for example, nitrates, acetates, chlorides or ammoniums. It should be noted that, in such a sol, the cerium can occur either completely in the form of colloids or simultaneously in the form of ions and in the form of colloids.

The mixture can be obtained without distinction either from compounds initially in the solid state which will subsequently be introduced into a vesicle of water, for example, or directly from solutions of these compounds.

The second stage of the process consists in heating the medium prepared in the preceding stage at a temperature of at least 100° C.

The temperature at which the medium is heated is generally between 100° C. and 150° C., more particularly between 110° C. and 130° C. The heating operation can be carried out by introducing the liquid medium into a closed chamber (closed reactor of the autoclave type). Under the temperature conditions given above and in an aqueous medium, it may thus be specified, by way of illustration, that the pressure in the closed reactor can vary between a value of greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). It is also possible to carry out the heating in an open reactor for temperatures in the vicinity of 100° C.

The heating can be carried out either under air or under an inert gas atmosphere, preferably nitrogen.

The duration of the heating can vary within wide limits, for example between 30 minutes and 48 hours, preferably between 1 and 5 hours. Likewise, the rise in temperature takes place at a rate which is not critical and it is thus possible to reach the set reaction temperature by heating the medium for, for example, between 30 minutes and 4 hours, these values being given entirely by way of indication.

A precipitate is obtained on conclusion of the heating operation, which precipitate is separated from the liquid medium by any suitable means, for example by withdrawing the aqueous mother liquors. A compound of the other rare earth metal is added to the precipitate thus separated, forming a second liquid medium.

The rare earth metal compound can be of the same nature as the cerium compound used in the first stage of the process. That which was described above for this compound thus applies here to the rare earth metal compound, which can more particularly be chosen from the nitrates, sulfates, acetates or chlorides.

In another stage of the process, the second liquid medium is heated at a temperature of at least 100° C.

Here again, that which was described above for the first heating operation likewise applies here for the second heating operation.

On conclusion of this second heating operation, the reaction medium obtained is brought to a basic pH. For this, a basic compound is introduced into the reaction medium. Use may be made, as base or basic compound, of the products of the hydroxide type. Mention may be made of alkali metal or alkaline earth metal hydroxides. Use may also be made of secondary, tertiary or quaternary amines. However, amines and aqueous ammonia solution may be preferred insofar as they reduce the risks of pollution by the alkali metal or alkaline earth metal cations. Mention may also be made of urea. The basic compound can more particularly be used in the form of a solution.

The value of the pH to which the medium is brought can more particularly be between 8 and 10, more particularly between 8 and 9.

In a final stage of the process, the precipitate recovered is subsequently calcined. This calcination makes it possible to develop the crystallinity of the product formed and it can also be adjusted and/or chosen as a function of the subsequent operating temperature intended for the composition of this specific embodiment of the invention, this being done while taking into account the fact that the specific surface of the product decreases as the calcination temperature employed increases. Such a calcination is generally carried out under air but a calcination carried out, for example, under an inert gas or under a controlled atmosphere (oxidizing or reducing) is very clearly not ruled out.

In practice, the calcination temperature is generally limited to a range of values between 300° C. and 1000° C.

The process of the invention can be used for the treatment of any type of gas comprising $CO_2$.

This can, for example, be gases produced by industrial plants in which hydrocarbons, coal or any fuel producing $CO_2$ is combusted, such as boilers or gas turbines. This can also be gases resulting from petrochemical refining processes, such as those resulting from catalytic cracking units, or gases resulting from cement works. Finally, the process of the invention can also be used for gases produced by domestic systems, such as gas or fuel oil boilers.

These gases can comprise, for example, between 50% and 80% of nitrogen, between 5% and 20% of carbon dioxide ($CO_2$), between 2% and 10% of oxygen ($O_2$) and optionally other impurities, such as $SO_x$, $NO_x$, dust and other particles.

These gases can exhibit a temperature ranging from ambient temperature (that is to say, between 15° C. and 25° C.) and 850° C., in particular between 40° C. and 500° C., these temperatures not being limited and only being given purely by way of illustration.

In a known way, it is possible to subject the gases to a pretreatment in order to remove the impurities, such as $SO_x$, $NO_x$, dust or other particles, or to reduce the amounts of them.

The treatment of the gases takes place by bringing the gases into contact with the rare earth metal compound described above. This contacting operation can be carried out in a reactor especially provided for this operation or in an exchanger or a compressor or optionally any other device of a plant through which the gases pass.

The compound must have been shaped.

It can be provided, for example, in the extruded or bead form. The compound shaped can additionally comprise a binder. This binder is chosen from those which are normally used in extrusion techniques, such as, for example, silica, alumina, boehmite, clays, silicates, aluminosilicates, titanium sulfate or ceramic fibers. These binders are present in the proportions generally used, that is to say up to approximately 30% by weight, more particularly of at most approximately 15% by weight.

The compound can also be in the form of a coating on a ceramic or metal substrate or on the internal parts of the reactor: walls or distributor plates, or the internal parts of an exchanger, of a compressor or of any device in which the gas to be treated may pass.

During the operation in which the gas to be treated is brought into contact with the compound based on rare earth metal, the $CO_2$ of the gas is absorbed on the compound and a gas depleted in $CO_2$ is thus recovered.

The process of the invention can comprise an additional stage of desorption of the carbon dioxide from the rare earth metal compound, on conclusion of which the carbon dioxide is recovered. This desorption can be carried out by passing a hot gas over this compound. This gas can, for example, be natural gas or air.

The temperature of the hot gas is that which makes possible effective desorption of the $CO_2$. An important advantage of the invention is that the temperature of this gas can be relatively low. The temperature of this gas can be in particular at most 350° C., more particularly at most 300° C. and more particularly still at most 250° C.

Examples will now be given.

EXAMPLE 1

This example relates to the preparation of compounds based on rare earth metal which can be used in the process of the invention.

Four compounds are prepared, the compositions of which are given in table 1 below.

TABLE 1

| Compound | $CeO_2$ (% by wt.) | $La_2O_3$ (% by wt.) | $ZrO_2$ (% by wt.) | $Pr_6O_{11}$ (% by wt.) | $SBET^{(1)}$ ($m^2/g$) |
|---|---|---|---|---|---|
| Example 1-A | 90 | 0 | 5 | 5 | 70 |
| Example 1-B | 80 | 3 | 10 | 7 | 45 |
| Example 1-C | 90 | 5 | 0 | 5 | 73 |
| Example 1-D | 86 | 4 | 10 | 0 | 73 |

$^{(1)}$This is the specific surface of the composition on conclusion of the preparation given in the examples.

The preparation of the various compounds is given below.

EXAMPLE 1-A

This example illustrates the preparation of the mixed oxide of formula $CeO_2$—$ZrO_2$—$Pr_6O_{11}$ which has the composition of table 1 and which is obtained by a process of the type of that described in EP-A-906 244 mentioned above, to which reference may be made.

A ceric nitrate solution (obtained according to the document FR-A-2 570 087) preneutralized by addition of $NH_4OH$ such that r=−0.22, a praseodymium nitrate solution and a zirconyl nitrate solution which meets the condition $OH^-/Zr$ molar ratio=1.17 are mixed in the stoichiometric proportions required to produce the above mixed oxide.

r represents the degree of neutralization of the cerium solution defined by the following equation:

$$r = \frac{n3 - n2}{n1}$$

in which n1 represents the total number of moles of Ce(IV) present in the solution after neutralization, n2 represents the number of moles of OH⁻ ions actually necessary to neutralize the initial free acidity contributed by the aqueous solution of cerium(IV) salt and n3 represents the total number of moles of OH⁻ ions contributed by the addition of the base.

The molar ratio OH⁻/Zr corresponds to the amount of base which it is necessary to add in order to reach the equivalent point during the acid/base titration of the zirconyl nitrate solution.

The concentration of this mixture (expressed as oxide of the various elements) is subsequently adjusted to 80 g/l. This mixture is subsequently brought to 150° C. for 4 hours.

An aqueous ammonia solution is subsequently added to the reaction medium so that the pH is greater than 8.5. The reaction medium thus obtained is brought to reflux for 2 hours. After separating by settling and then withdrawing, the solid product is resuspended and the medium thus obtained is treated at 100° C. for 1 hour. The product is subsequently filtered off then calcined at 700° C. under air for 2 hours.

EXAMPLE 1-B

This example illustrates the preparation of the mixed oxide of formula $CeO_2$—$ZrO_2$—$La_2O_3$—$Pr_6O_{11}$ having the composition of table 1.

The procedure is the same as that of example 1-A, lanthanum nitrate being additionally added with the other precursors. The final calcination is carried out at 850° C. for 2 hours.

EXAMPLE 1-C

This example illustrates the preparation of the mixed oxide of formula $CeO_2$—$La_2O_3$—$Pr_6O_{11}$ having the composition of table 1.

201.6 ml of a ceric nitrate solution comprising 90 mol % of cerium(IV) ions and comprising 50 g of $CeO_2$ are neutralized with 5.7 ml of a 25% aqueous ammonia solution and then diluted with 792.7 ml of pure water. This solution is subsequently heated at 100° C. for 0.5 hour. After removing the aqueous mother liquors, 6.1 ml of a lanthanum nitrate solution comprising 2.63 g of $La_2O_3$ and 5.3 ml of a praseodymium nitrate solution comprising 2.63 g of $Pr_6O_{11}$ are added to the medium. Pure water is added in order to bring the total volume of the solution to 1 liter. The solution is subsequently heated a 120° C. for 2 hours. After cooling the solution to 85° C., a 25% aqueous ammonia solution is added with stirring so as to adjust the pH to 8.5. The suspension obtained is filtered through a Nutsche filter in order to obtain a precipitate. The precipitate is calcined under air at 300° C. for 10 hours and then at 700° C. for 2 hours.

EXAMPLE 1-D

This example illustrates the preparation of the mixed oxide of formula $CeO_2$—$ZrO_2$—$La_2O_3$ having the composition of table 1.

The procedure is the same as that of example 1-A, lanthanum nitrate being added as a replacement for the praseodymium nitrate.

COMPARATIVE EXAMPLE 2

This example relates to the preparation of a compound comprising an alkaline earth metal element known for storing $CO_2$. A solution comprising 4.10 g of barium nitrate (Prolabo Rectapur 99%) and 17.5 g of demineralized water is heated at 80° C. in a beaker equipped with a magnetic bar.

15.69 g of alumina, obtained by calcination of a boehmite gel (Sasol Pural SB1) at 850° C. under air for 2 hours, are impregnated with this solution at 80° C.

The impregnated alumina is then dried at 100° C. for 3 hours. This procedure is repeated a second time with the same amount of the barium nitrate solution. The alumina thus obtained is dried at 100° C. for 3 hours. The powder obtained is calcined under air at 500° C. for 2 hours.

The compound 2-E thus obtained comprises 80% by weight of alumina and 20% by weight of barium oxide BaO. It exhibits a specific surface of 81 m²/g.

EXAMPLE 3

This example gives a comparison of the temperatures for release of the $CO_2$ adsorbed on the various compounds of the preceding examples.

The adsorption of the $CO_2$ was carried out under the following conditions. A synthetic gas comprising 10% of $CO_2$ in air is subsequently passed for 1 hour at a flow rate of 1 l/h at ambient temperature over 10 g of each of the compounds 1-A to 2-E.

The thermogravimetric analysis (TGA) technique is used to carry out this temperature measurement. This technique consists in heating approximately 20 mg of each of the compounds of the preceding examples, accurately weighed, under a stream of synthetic air at the rate of 30 ml/min. An increase in temperature is applied between ambient temperature and 700° C. at the rate of an increase of 10° C./min, which brings about the release of the $CO_2$ and the emission of $CO_2$ in the gas exiting from the device. The content of $CO_2$ in the gas exiting from the device is determined by mass spectrometry.

A comparison is given in table 2 below of the temperature window for departure of $CO_2$, characterized by a minimum temperature from which the $CO_2$ is emitted and a final temperature at which the emission of $CO_2$ stops. $CO_2$ is emitted continuously between these two temperatures. The temperature referred to as maximum temperature, which corresponds to the temperature at which the maximum of $CO_2$ is emitted, is also mentioned.

TABLE 2

| Compound | Minimum temperature (° C.) | Final temperature (° C.) | Maximum temperature (° C.) |
|---|---|---|---|
| 1-A | 50 | 240 | 120 |
| 1-B | 50 | 220 | 100 |
| 1-C | 50 | 250 | 100 |
| 1-D | 50 | 240 | 120 |
| 2-E, comparative | 80 | 630 | 240 |

It is found that the four compounds in accordance with the invention comprising cerium and optionally zirconium, lanthanum and/or praseodymium (1-A to 1-D) result in a release of the $CO_2$ over a narrower temperature range, generally between 50 and 250° C., whereas the comparative compound (2-E) results in an emission of $CO_2$ over a broader window, in particular up to 630° C. The maximum temperature for release of the $CO_2$ is also lower with regard to the compounds 1-A to 1-D, 100 to 120° C., in contrast to 240° C. for the compound 2-E.

What is claimed is:

1. A process for the treatment of a $CO_2$-containing gas in order to reduce the carbon dioxide content thereof, comprising contacting the gas with a compound of at least one rare earth metal, whereby the carbon dioxide is adsorbed onto the compound and a gas depleted in carbon dioxide is obtained, wherein such compound consists of cerium oxide and at least one oxide of one element chosen from zirconium and the rare earth metals other than cerium, the content of cerium is at least 80% by weight.

2. The process as defined by claim 1, wherein the compound consists of cerium oxide, zirconium oxide, and an oxide of at least one rare earth metal other than cerium.

3. The process as defined by claim 1, wherein the at least one rare earth metal other than cerium is selected from among lanthanum and praseodymium.

4. The process as defined by claim 1, wherein the compound is in the form of a solid solution.

5. The process as defined by claim 1, further comprising an additional stage of desorption of the carbon dioxide from the compound on which carbon dioxide has been absorbed of at least one rare earth metal, after which the carbon dioxide is recovered.

6. The process as defined by claim 5, wherein the desorption stage is carried out by passing a hot gas over said compound.

7. The process of claim 6, wherein the gas is at a temperature of at most 250° C.

8. The process as defined by claim 1, wherein the compound exhibits a cerium/zirconium atomic proportion of at least 1 and a specific surface area of at least 35 $m^2/g$ after calcination at 900° C. for 6 hours.

9. The process as defined by claim 1, wherein the compound exhibits a specific surface area of at least 45 $m^2/g$ after calcination at 900° C. for 6 hours.

* * * * *